United States Patent [19]
Ogata

[11] Patent Number: 5,848,181
[45] Date of Patent: Dec. 8, 1998

[54] IMAGE PROCESSING METHOD, IMAGE PROCESSING APPARATUS, NOISE REMOVING METHOD, AND NOISE REMOVING APPARATUS

[75] Inventor: Masami Ogata, Kanagawa, Japan

[73] Assignee: Sony Corporation, Japan

[21] Appl. No.: 684,773

[22] Filed: Jul. 16, 1996

[30] Foreign Application Priority Data

Jul. 26, 1995 [JP] Japan .................................. 7-190015

[51] Int. Cl.[6] .............................. G06T 5/40; G06T 5/00; G06K 9/40; H04N 1/409
[52] U.S. Cl. ......................... 382/169; 382/171; 382/264; 382/274; 382/275; 382/266; 348/606; 348/672
[58] Field of Search .................................... 382/264, 260, 382/275, 171, 169, 168, 274, 261, 263, 266; 348/606, 607, 625, 671, 672; 358/447, 463

[56] References Cited

U.S. PATENT DOCUMENTS 5,450,502  9/1995  Eschbach et al. ....................... 382/274
5,680,477  10/1997  Asada ...................................... 382/274

*Primary Examiner*—Scott Rogers
*Attorney, Agent, or Firm*—Ronald P. Kananen

[57] ABSTRACT

In an image processing apparatus, a uniform region whose luminance level change is small is correctly extracted from a noise-containing image. To this end, this image processing apparatus includes an extracting module for extracting a high frequency component of a luminous signal of the image over an entire portion of the image within one screen; histogram generating module for generating a histogram of a luminance level of the luminance signal for one screen on the basis of the output value of the extracting module; coefficient calculating module for analyzing the histogram to calculate a predetermined coefficient indicative of likeness of the uniform region every luminance level; and pixel-position-depending coefficient producing module for establishing a correspondence relationship between the predetermined coefficient calculated by the coefficient calculating module and all of the pixel positions on the image in correspondence to the luminous level of the luminance signal from each of the pixel positions.

18 Claims, 8 Drawing Sheets

UNIFORM REGION DETECTING APPARATUS 1

UNIFORM REGION DETECTING APPARATUS 1

SCANNING DIRECTION OF IMAGE

UNIFORM REGION DETECTING APPARATUS 20

EDGE ENHANCING APPARATUS 30

EDGE ENHANCER 31

EDGE ENHANCING APPARATUS 50

GRADATION CONVERTING APPARATUS 70

GRADATION CONVERTER 71

EXAMPLE OF GRADATION CONVERTING FUNCTION "g"

NOISE REMOVING APPARATUS 90

ADAPTIVE TYPE SMOOTHING DEVICE 91

SETTING OF THRESHOLD VALUE "TH1"

IMAGE PROCESSING METHOD, IMAGE PROCESSING APPARATUS, NOISE REMOVING METHOD, AND NOISE REMOVING APPARATUS

BACKGROUND OF THE INVENTION

The present invention generally relates to an image processing method, an image processing apparatus, a noise removing method, and a noise removing apparatus. More specifically, the present invention is directed to an image processing method, an image processing apparatus, a noise removing method, and a noise removing apparatus, capable of correctly performing an image processing operation by detecting a high frequency signal component of a brightness (luminance) signal of an overall image within one screen.

In image input/output apparatus such as televisions, video cameras, and video printers capable of reproducing natural images, image enhancing process operations (edge enhancing process, gradation converting process, and the like) are performed with respect to luminance (brightness) signals in order to improve sharpness feelings as well as contrast feelings of natural images to be reproduced. Also, in these image input/output apparatuses, a process operation (noise removing process) for removing, or eliminating noise superimposed on an inputted image signal, or an outputted image signal.

To execute the above-explained image enhancing process operation and noise removing process operation, a uniform image (namely, uniform region) detecting process operation is carried out.

Conventionally, as this process operation to detect such a uniform region, the following process operations are carried out, namely, the "process to combine pixels", the "dividing process by edges", and the "process based on dispersion within proximate regions". In the "process to combine pixels", a level difference in luminance between proximate pixels is calculated, and pixels having small level differences are combined with each other. In the "dividing process by edges", an edge position having a large level difference in luminance is detected, and then a region is subdivided by this edge. In the "process based on dispersion within proximate regions" functioning as the simple processing operation, when dispersion in luminance levels of pixels within a proximate region is small, a judgment is made that a central pixel thereof is contained in a uniform region.

However, the above-described uniform image detecting process operation owns various problems.

That is, since the conventional "process to combine pixels" and also "dividing process by edges" require a large number of memories, the manufacturing cost would be increased. Moreover, these conventional process operations own another problem in that lengthy calculation time is required to detect such a uniform region.

As a result, it is practically difficult to realize these uniform image detecting process operations (namely, "process to combine pixels" and "dividing process by edged") in the above-described image input/output apparatus such as a television.

The "process based on dispersion within proximate regions" has been employed as the simple process operation for detecting a uniform region in the image input/output apparatus. However, this simple uniform region detecting process operation owns such a problem that since only local information (luminance level) within the proximate region is utilized without employing the overall information about one screen, the uniform region would be incorrectly detected. In other words, although a region to be detected corresponds to a uniform region, this region could not be detected as the uniform region.

Also, the above-described image enhancing process operation (edge enhancing process, and gradation converting process) has another problem in that since this image enhancing process is carried out with respect to the entire image, the noise components superimposed on the image signal of the uniform region would be enhanced in such a uniform region where there is less signal component by which desirable enhancing effects are obtained (namely, enhancing process is not so required).

Furthermore, the above-explained noise removing process operation is carried out by executing the smoothing process over the entire image. However, in order that lowering of image resolution is suppressed to a minimum value (namely, in order not to smooth an edge portion), the relatively weak smoothing process operation is carried out. Accordingly, there is a further problem that the noise reducing effects in the uniform region originally containing less high frequency components (namely, a small change in luminance levels) would be insufficiently achieved.

SUMMARY OF THE INVENTION

The present invention has been made to solve the above-explained various problems, and therefore, has an object to provide such an image processing apparatus/method capable of correctly and quickly detecting an uniform region in low cost, and also to correctly performing an image enhancing process and a noise removing process.

An image processing apparatus, according to the present invention, is featured by an image processing apparatus for extracting a uniform region whose luminance level change is small from an image containing noise, comprising: extracting means for extracting a high frequency component of a luminance signal of said image over an entire portion of said image within one screen; histogram generating means for generating a histogram of a luminance level of said luminance signal for one screen based upon the output value of said extracting means; coefficient calculating means for analyzing said histogram to calculate a predetermined coefficient indicative of likeness of the uniform region every said luminance level; and pixel-position-depending coefficient producing means for establishing a correspondence relationship between said predetermined coefficient calculated by said coefficient calculating means and all of the pixel positions on the image in response to the luminance level of said luminance signal from each of said pixel positions.

Also, an image processing method, according to the present invention, is featured by an image processing method for extracting a uniform region whose luminance level change is small from an image containing noise, comprising the steps of: extracting a high frequency component of a luminance signal of said image over an entire portion of said image within one screen; generating a histogram of a luminance level of said luminance signal for one screen based upon the extracted output value; analyzing said histogram to calculate a predetermined coefficient indicative of likeness of the uniform region every said luminance level; and establishing a correspondence relationship between said predetermined coefficient and all of the pixel positions on the image in response to the luminance level of said luminance signal from each of said pixel positions.

A noise removing apparatus, according to the present invention, is featured by a noise removing apparatus for removing noise of an image, comprising: extracting means for extracting a high frequency component of a luminance signal of said image over an entire portion of said image within one screen; histogram generating means for generating a histogram of a luminance level of said luminance signal for one screen based upon the output value of said extracting means; coefficient calculating means for analyzing said histogram to calculate a predetermined coefficient indicative of likeness of the uniform region every said luminance level; pixel-position-depending coefficient producing means for establishing a correspondence relationship between said predetermined coefficient calculated by said coefficient calculating means and all of the pixel positions on the image in response to the luminance level of said luminance signal from each of said pixel position; and smoothing means for smoothing said luminance signals of all of said pixel positions on said image based upon said preselected coefficients made in correspondence with all of said pixel positions on said image.

Also, a noise removing method, according to the present invention, is featured by a noise removing method for removing noise of an image, comprising the steps of: extracting a high frequency component of a luminance signal of said image over an entire portion of said image within one screen; generating a histogram of a luminance level of said luminance signal for one screen based upon the extracted value; analyzing said histogram to calculate a predetermined coefficient indicative of likeness of the uniform region every said luminance level; establishing a correspondence relationship between said predetermined coefficient and all of the pixel positions on the image in response to the luminance level of said luminance signal from each of said pixel positions; and smoothing said luminance signals of all of the pixel positions within one screen based on said preselected coefficients made in correspondence with all of said pixel positions on the screen.

In the image processing apparatus of the present invention, the extracting means extracts a high frequency component of a luminance signal of said image over an entire portion of said image within one screen, and the histogram generating means generates a histogram of a luminance level of said luminance signal for one screen based upon the output value of said extracting means. The coefficient calculating means analyzes said histogram to calculate a predetermined coefficient indicative of likeness of the uniform region every said luminance level, and the pixel-position-depending coefficient producing means establishes a correspondence relationship between said predetermined coefficient calculated by said coefficient calculating means and all of the pixel positions on the image in response to the luminance level of said luminance signal from each of said pixel positions.

In the image processing method of the present invention, a high frequency component of a luminance signal of said image is extracted over an entire portion of said image within one screen, the histogram of a luminance level of said luminance signal for one screen is generated based upon the extracted output value. The histogram is analyzed to calculate a predetermined coefficient indicative of likeness of the uniform region every said luminance level, and a correspondence relationship between said predetermined coefficient and all of the pixel positions on the image is established in response to the luminance level of said luminance signal from each of said pixel positions.

In the noise removing apparatus of the present invention, the extracting means extracts a high frequency component of a luminance signal of said image over an entire portion of said image within one screen, and the histogram generating means generates a histogram of a luminance level of said luminance signal for one screen based upon the output value of said extracting means. The coefficient calculating means analyzes said histogram to calculate a predetermined coefficient indicative of likeness of the uniform region every said luminance level, and the pixel-position-depending coefficient producing means establishes a correspondence relationship between said predetermined coefficient calculated by said coefficient calculating means and all of the pixel positions on the image in response to the luminance level of said luminance signal from each of said pixel position. The smoothing means smoothes said luminance signals of all of said pixel positions on said image based upon said preselected coefficients made in correspondence with all of said pixel positions on said image.

In the noise removing method of the present invention, the high frequency component of a luminance signal of said image is extracted over an entire portion of said image within one screen, the histogram of a luminance level of said luminance signal for one screen is generated based upon the extracted value, the histogram is analyzed to calculate a predetermined coefficient indicative of likeness of the uniform region every said luminance level, and a correspondence relationship between said predetermined coefficient and all of the pixel positions on the image is established in response to the luminance level of said luminance signal from each of said pixel positions. Furthermore, the luminance signals of all of the pixel positions within one screen are smoothed based on said preselected coefficients made in correspondence with all of said pixel positions on the screen.

BRIEF DESCRIPTION OF THE DRAWINGS

For a better understanding of the present invention, reference is made of a detailed description to be read in conjunction with accompanying drawings, in which.

DETAILED DESCRIPTION OF THE PREFERRED EMBODIMENTS

Figure 1:
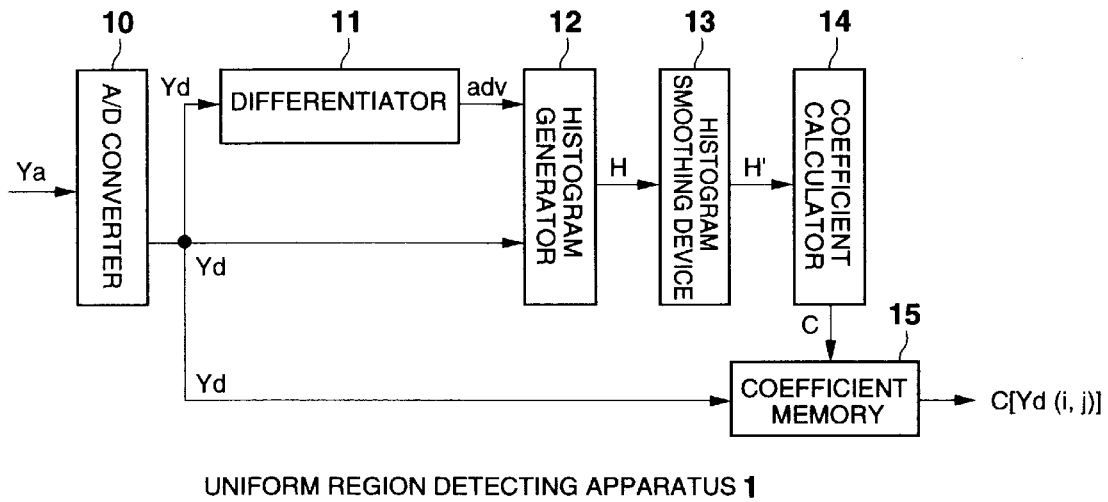
FIG. 1 is a schematic block diagram for representing an arrangement of a uniform region detecting apparatus according to an embodiment of the present invention.

Before describing various embodiments of the present invention, a relationship between each of appended claims and each of the below-mentioned embodiments will now be explained by defining the relevant embodiments in the respective means.

The image processing apparatus, as recited in the first aspect of the embodiment, is featured by such an image processing apparatus for extracting a uniform region whose luminance level change is small from an image containing noise, comprising:

extracting means (for instance, a differentiator 11 of FIG. 1) for extracting a high frequency component of a luminance signal of said image over an entire portion of said image within one screen;

histogram generating means (e.g., a histogram generator 12 of FIG. 1) for generating a histogram of a luminance level of said luminance signal for one screen based upon the output value of said extracting means;

coefficient calculating means (e.g., a coefficient calculator 14 of FIG. 1) for analyzing said histogram to calculate a predetermined coefficient indicative of likeness of the uniform region every said luminance level; and pixel-position-depending coefficient producing means (for example, a coefficient memory 15 of FIG. 1) for establishing a correspondence relationship between said predetermined coefficient calculated by said coefficient calculating means and all of the pixel positions on the image in response to the luminance level of said luminance signal from each of said pixel positions.

The image processing apparatus, as recited in the third aspect of the embodiment, is featured by further comprising delay means (e.g., an image memory 21 of FIG. 4) for delaying said luminance signal in order that said coefficient correspondence relationship establishing operation by said pixel-position-depending coefficient producing means is correctly performed without any time delay for one screen.

The image processing apparatus, as recited in the fifth aspect of the embodiment, is characterized by further comprising signal processing means (e.g., an edge enhancer 31 of FIG. 5) for performing a predetermined process operation to said luminance signal based on said predetermined coefficient.

The image processing apparatus, as recited in the eighth aspect of the embodiment, is characterized by further comprising delay means (e.g., an image memory 51 of FIG. 7) for delaying said luminance signal in order that the signal process operation by said signal processing means is correctly carried out without any time delay of one screen.

The noise removing apparatus, as recited in the eleventh aspect of the embodiment, is featured by such a noise removing apparatus for removing noise of an image, comprising:

extracting means (e.g., a differentiator 11 of FIG. 1) for extracting a high frequency component of a luminance signal of said image over an entire portion of said image within one screen;

histogram generating means (e.g., a histogram generator 12 of FIG. 1) for generating a histogram of a luminance level of said luminance signal for one screen based upon the output value of said extracting means;

coefficient calculating means (e.g., a coefficient calculator 14 of FIG. 1) for analyzing said histogram to calculate a predetermined coefficient indicative of likeness of the uniform region every said luminance level;

pixel-position-depending coefficient producing means (for instance, a coefficient memory 15 of FIG. 1) for establishing a correspondence relationship between said predetermined coefficient calculated by said coefficient calculating means and all of the pixel positions on the image in response to the luminance level of said luminance signal from each of said pixel position; and smoothing means (for example, an adaptive type smoothing device 91 of FIG. 12) for smoothing said luminance signals of all of said pixel positions on said image based upon said preselected coefficients made in correspondence with all of said pixel positions on said image.

Figure 12:
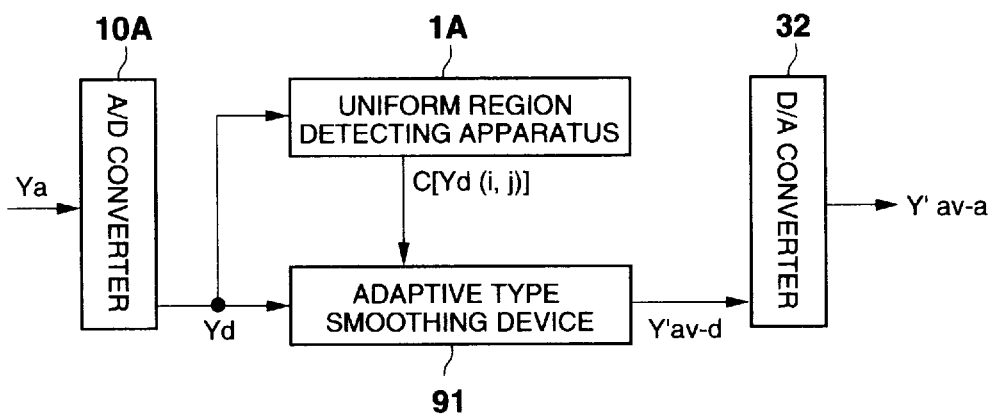
FIG. 12 is a schematic block diagram for showing an arrangement of a noise removing apparatus according to an embodiment of the present invention.

The noise removing apparatus, as recited in the fourteenth aspect of the embodiment, is featured by further comprising delay means (e.g., a coefficient memory 15B of FIG. 8 in case that the adaptive type smoothing device 91 of FIG. 12 is provided at the position of the edge enhancer 31 of FIG. 8) for delaying said luminance signal in order that said preselected coefficient correspondence establishing process operation by the pixel-position-depending coefficient producing means is correctly carried out with said smoothing process operation of said luminance signal by said smoothing means without any time delay of one image.

It should be noted that this description does not imply that the respective means are limited to the above-described items.

Figure 2:
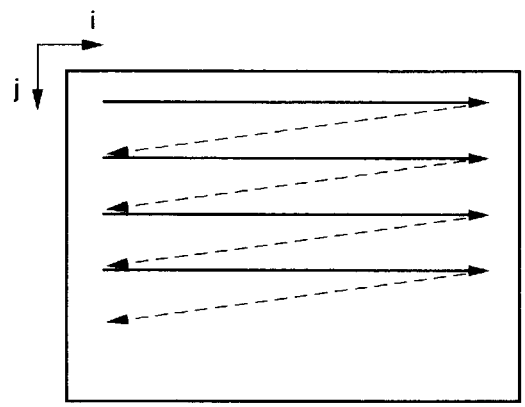
FIG. 2 is an explanatory diagram for explaining a scanning direction of an image.

FIG. 1 is a schematic block diagram for indicating an arrangement of a uniform region detecting apparatus according to an embodiment of the present invention. In the uniform region detecting apparatus 1 of this embodiment, an A/D converter 10 A/D-converts an analog luminance (brightness) signal Ya which is produced by scanning an image along a horizontal direction as shown in FIG. 2, into a digital luminance signal Yd. Then, this digital luminance signal is supplied to a differentiator 11, a histogram generator 12, and a coefficient memory 15.

It should be understood in the following description that symbol Yd (i, j) represents a pixel value at a preselected pixel position (i, j) within one screen, namely a digital luminance signal of a preselected pixel position (i, j) within one screen; symbol "i" denotes a pixel position along the horizontal direction; symbol "j" shows a pixel position along the vertical direction.

The differentiator 11 corresponds to one sort of high-pass filter for extracting only a high frequency (RF) signal component of the luminance signal. This differentiator 11 sequentially calculates a secondary differentiated value dv (i, j) of the digital luminance signal Yd (i, j) of a preselected pixel position, which is supplied from the A/D converter 10, over the entire one screen (will be explained later), and then supplies an absolute value adv (i, j) of this secondary differentiated value dv (i, j) (will be referred to as a "differentiated absolute value adv (i, j)" hereinafter) to the histogram generator 12.

The histogram generator 12 generators a histogram H of a luminance level L of one screen based upon the differentiated absolute value adv (i, j) supplied from the differentiator 11 (for one screen), and then supplies this histogram H to a histogram smoothing device 13 (will be explained later).

The histogram smoothing device 13 smoothes the histogram H of one screen supplied from the histogram generator 12 along the level direction so as to produce a smoothed histogram H' (will be discussed later). This histogram H' is furnished to the coefficient calculator 14.

The coefficient calculator 14 calculates such a coefficient C [L] indicative of a uniform region corresponding to the luminance level "L" (will be referred to as a "uniform region coefficient" hereinafter) based on the smoothed histogram H' supplied from the histogram smoothing device 13 (will be explained later). Furthermore, when the coefficient calculator 14 calculates the uniform region coefficient C [L] as to all of the luminance levels, this coefficient calculator 14 supplies this uniform region coefficient C [L] as a coefficient table "C" to the coefficient memory 15.

The coefficient memory 15 compares the digital luminance signal Yd (i, j) supplied from the A/D converter 10 with the coefficient table C supplied from the coefficient calculator 14. Then, the coefficient memory 15 allocates the uniform region coefficient C [L] corresponding to the luminance level L of the digital luminance signal Yd (i, j) to this pixel position (i, j) so as to thereby produce a pixel-position-depending uniform region coefficient C [Yd (i, j)] indicative of possibility such that the pixel position (i, j) is contained in the uniform region with respect to one screen, and then outputs this pixel-position-depending uniform region coefficient C [Yd (i, j)].

Next, a description will now be made of operations of the uniform region detecting apparatus 1 shown in FIG. 1.

The analog luminance signal Ya obtained by scanning the image in the horizontal direction is inputted into the A/D converter 10 so as to be converted into the digital luminance signal Yd (namely, Yd (i, j)), and then this digital luminance signal Yd is supplied to the differentiator 11, the histogram generator 12, and the coefficient memory 15.

The differentiator 11 calculates the secondary differentiated value dv (i, j) of the digital luminance signal Yd (i, j) supplied from the A/D converter 10 based upon the following formula (1):

$$dv(i, j) = 2 \cdot Yd(i, j) - Yd(i-D, j) - Yd(i+D, j) \quad (1).$$

It should be understood that symbol "D" expressed in the formula (1) is predetermined constant, and represents a pixel interval used to calculate the secondary differentiated value dv (i, j).

Furthermore, the differentiator 11 calculates the absolute value of this calculated secondary differentiated value dv (i, j) based upon the formula (2):

$$adv(i, j) = |dv(i, j)| \quad (2),$$

where symbol adv (i, j) contained in the above-described formula (2) is equal to the absolute value of the secondary differentiated value dv (i, j) (namely, a differentiated absolute value). The differentiator 11 supplies this differentiated absolute value adv (i, j) to the histogram generator 12.

Both the digital luminance signal Yd (i, j) from the A/D converter 10 and the differentiated absolute value adv (i, j) from the differentiator 11 are supplied to the histogram generator 12. Then, when the differentiated absolute value adv (i, j) is smaller than a preselected threshold value $TH_1$ (will be explained later), the histogram generator 12 adds "1" to a degree H "L" of a luminance (brightness)level "L" of the digital luminance signal Yd (i, j) of the pixel position (i, j) corresponding to this differentiated absolute value adv (i, j). Furthermore, the histogram generator 12 executes this process operation as to all of the pixel positions within one screen in order to generate a histogram H of the luminance level L for one screen, and thereafter supplies this histogram to the histogram smoothing device 13.

It should be noted that in case of this embodiment, such a digital luminance signal Yd (i, j) corresponding to the differentiated absolute value adv (i, j) larger than a preselected threshold value $TH_1$ is recognized as an effective signal component indicative of an edge and the like (namely, not correspond to a signal indicative of noise), and thus this digital luminance signal Yd (i, j) is not used to produce the histogram H of the luminance level L. The setting operation of this preselected threshold value $TH_1$ will be explained later.

The histogram smoothing device 13 performs the smoothing process along the level direction with respect to the supplied histogram H with employment of a one-dimensional mean value (averaging) filter as indicated in the below-mentioned formula (3) to thereby produce a smoothed histogram H':

$$H'[L] = \sum_{dL=-L/2}^{L/2} H[L + dL]. \quad (3)$$

It should be noted that the present invention is not limited to the above-explained smoothing process operation by the mean value filter defined in the formula (3), but may be applied to such a smoothing process of the histogram H by employing a median filter in which a median (center value) of a degree of a luminance level adjacent to the interest luminance level is set to a degree of a central luminance level.

Figure 3A:
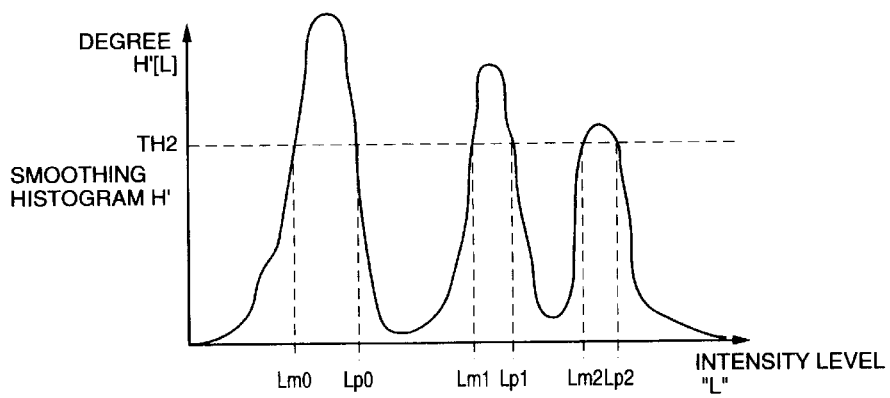
FIG. 3A and FIG. 3B are graphic representations for representing a smoothing histogram H' and a coefficient table C.
Figure 3B:
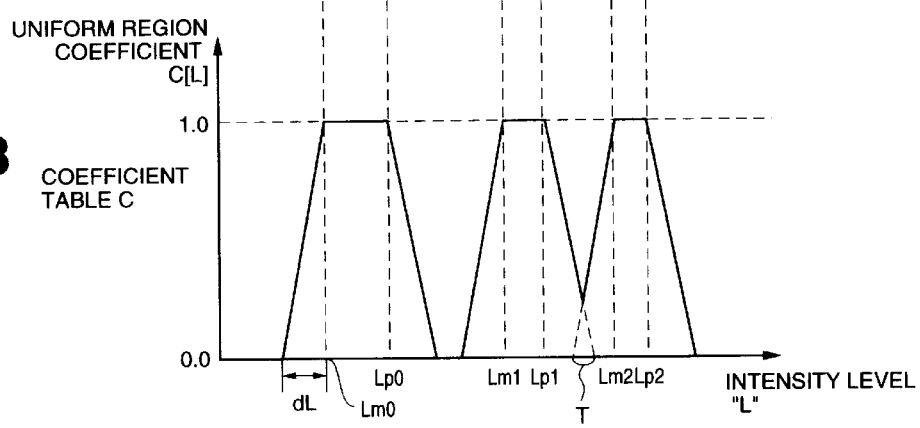

FIG. 3A graphically shows the histogram H' smoothed by the histogram smoothing device 13. An abscissa of FIG. 3A denotes a luminance level "L", and an ordinate shows a degree H' [L] of a digital luminance signal Yd (i, j) having various luminance levels. The histogram smoothing device 13 supplies the smoothed histogram H' shown in FIG. 3A to the coefficient calculator 14. The coefficient calculator 14 analyzes the supplied smoothed histogram H' to thereby calculate a uniform region efficient C [L] with respect to each of the luminance level L. FIG. 3B graphically indicates a relationship between the luminance level L and the uniform region coefficient C [L] calculated by the coefficient calculator 14 (namely, a diagram for showing a coefficient table C). A coefficient calculating process by the coefficient calculator 14 will now be described as follows:

That is, the coefficient calculator 14 detects such a luminance level having a degree H' [L] larger than a predetermined threshold value $TH_2$ in the supplied smoothed histogram H' (see FIG. 3A) to thereby set a uniform region coefficient C [L] of this luminance level to "1" (see FIG. 3B). In other words, according to this embodiment, as illustrated in FIG. 3A, since the luminance level having the degree H' [L] larger than a predetermined threshold value $TH_2$ corresponds to luminance levels Lm0 to Lp0 to, Lm1 to Lp1, and Lm2 to Lp2, the uniform region coefficient C [L] having this luminance level is set to "1" as shown in FIG. 3B.

Furthermore, the coefficient calculator 14 calculates a uniform region coefficient C [L] corresponding to such a luminance level other than a range of the above-described luminance level (namely, a range of luminance level having a larger degree than a preselected threshold value $TH_2$) based on the below-mentioned formula (4):

$$C[L] = \begin{cases} \dfrac{(L - L_m + dL)}{dL} & \ldots L_m - dL \leq L \leq L_m \\ \dfrac{(L_p + dL - L)}{dL} & \ldots L_p \leq L \leq L_p + dL \end{cases} \quad (4)$$

Symbol "Lm" shown in the above-described formula (4) indicates a minimum level of a luminance level range where the value of the uniform region coefficient C [L] is 1 (in this embodiment, luminance levels Lm0, Lm1, Lm2 of FIG. 3A), whereas symbol "Lp" denotes a maximum level of the luminance level range where the value of the uniform region coefficient C [L] is 1 (in this embodiment, luminance levels Lp0, Lp1, Lp2 of FIG. 3A). Also, symbol "dL" is a preselected constant which is previously set.

In the case that the uniform region coefficient is calculated by using the above-described formula (4), when two sets of uniform region coefficients C [L] are calculated in correspondence with a single luminance level (for example, a predetermined section T between luminance levels Lp1 to Lm2 in FIG. 3B), the uniform region coefficient C [L] having the large value is recognized as a uniform region coefficient corresponding to this luminance level L. Within another range of a luminance level which does not correspond to the uniform region coefficient C [L] by the above formula (4) (for instance, a range smaller than luminance levels L0m−dL, a range between luminance level Lp0+dL and luminance level Lm1−dL, and a range larger than luminance level Lp2+dL), "0" corresponds to the uniform region coefficient C [L].

In other words, when there are many differentiated absolute values adv (values indicative of variation dimensions of luminance level) with respect to the same luminance level, since there are great possibilities that the luminance signal having this luminance level corresponds to the luminance signal contained in the uniform region, the coefficient calculator 14 sets a large value (maximum value being 1) as the uniform region coefficient corresponding to such a luminance level L where, as described above, the value of the degree H' [L] of the smoothing histogram H' is large.

As a consequence, the larger the value of the uniform region coefficient C [L] (especially, its value is approximated to 1) corresponding to a predetermined luminance level L, the higher the possibility such that the pixel position (i, j) of the digital luminance signal Yd (i, j) having this luminance level L is contained in the uniform region.

The coefficient calculator 14 supplies the calculated uniform region coefficient (namely, coefficient table C shown in FIG. 3B) for one screen to the coefficient memory 15. In addition to this coefficient table C (see FIG. 3B), the digital luminance signal Yd (i, j) is supplied from the A/D converter 10. The coefficient memory 15 allocates the uniform region coefficient C [L] to each pixel in response to the luminance level L of the respective digital luminance signals Yd (i, j) to thereby produce a pixel-position-depending uniform region coefficient C [Yd (i, j)]. Then, the produced pixel-position-depending uniform region coefficiency C [Yd (i, j)] is externally outputted. In the following description, a uniform region coefficient in a pixel region (i, j) is expressed as C (i, j).

In this embodiment, since the secondary differentiated value of the luminance signal for one screen (namely, high frequency component of luminance signal) is calculated and then the uniform region is detected based on the secondary differentiated value of this one screen, it is possible to correctly and quickly detect the uniform region.

On the other hand, in the uniform region detecting apparatus shown in FIG. 1, the histogram H of the luminance level "L" is produced based on the digital luminance signal Yd (i, j) for one screen, and thus such a coefficient table C as shown in FIG. 3B (namely, uniform region coefficiency C [L] for one screen) is calculated. As a consequence, since time for one screen is required to calculate the coefficient table C, when this coefficient table C is supplied to the coefficient memory 15, a digital luminance signal Yd (i, j) about the next screen (namely, one subsequent screen) is supplied from the A/D converter 10 to the coefficient memory 15.

Accordingly, in case of the uniform region detecting apparatus 1 shown in FIG. 1, the allocations of the uniform region coefficients C [L] to the respective pixel positions (i, j) performed in the coefficient memory 15 are executed with having the time delay of one screen. In particular, when an image signal to be inputted is a moving picture signal, the correctness in the detection of the uniform region would be slightly deteriorated. To avoid this deterioration, another uniform region detecting apparatus shown in FIG. 4 may be employed.

Figure 4:
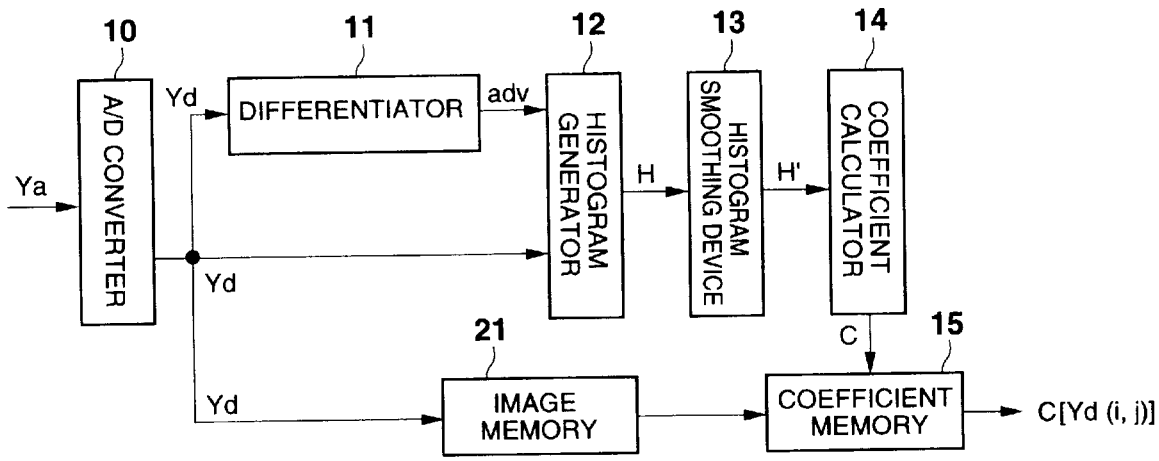
FIG. 4 is a schematic block diagram for indicating an arrangement of a uniform region detecting apparatus according to another embodiment of the present invention.

FIG. 4 is a block diagram for indicating an arrangement of another uniform region detecting apparatus 20 according to another embodiment of the present invention. The arrangement of the uniform region detecting apparatus 20 shown in FIG. 4 is basically similar to the above-described arrangement of the uniform region detecting apparatus indicated in FIG. 1, further including an image memory 21 interposed between the A/D converter 10 and the coefficient memory 15.

In the uniform region detecting apparatus 20 of this embodiment, a digital luminance signal Yd (i, j) outputted from the A/D converter 10 is stored in an image memory 21, and is delayed by one screen data, and thereafter, the delayed digital luminance signal is supplied to the coefficient memory 15. It should be noted that the not delayed digital luminance signal Yd (i, j) is supplied to the differentiator 11 and the histogram generator 12.

As a result, in the case of this uniform region detecting apparatus 20 according to this embodiment, when the coefficient table C is supplied to the coefficient memory 15, the digital luminance signal Yd (i, j) of the screen used to calculate the coefficient table C is supplied to the coefficient memory 15. Accordingly, the digital luminance signal Yd (i, j) can be correctly made in correspondence with the uniform region coefficient C [L] without any time delay, so that the uniform region can be further correctly detected.

Figure 5:
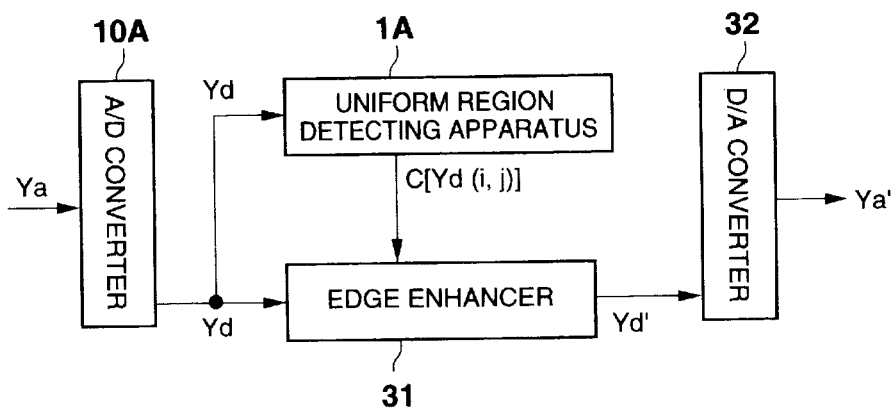
FIG. 5 is a schematic block diagram for showing an arrangement of an edge enhancing apparatus according to an embodiment of the present invention.

FIG. 5 is a block diagram for representing an arrangement of an edge enhancing apparatus 30 according to an embodiment, to which the present invention has been applied. In the edge enhancing apparatus 30 of this embodiment, an A/D converter 10A will A/D-convert an analog luminance signal Ya externally supplied thereto into a digital luminance signal Yd corresponding thereto, and then furnishes this digital luminance signal Yd to a uniform region detecting apparatus 1A and an edge enhancer 31.

The uniform region detecting apparatus 1A has a substantially same arrangement as that of the uniform region detecting apparatus 1 shown in FIG. 1 (except for the A/D converter 10). This uniform region detecting apparatus 1A produces the above-explained pixel-position-depending uniform region coefficient C [Yd (i, j)] which will be then supplied to the edge enhancer 31.

The edge enhancer 31 converts the digital luminance signal Yd (i, j) supplied from the A/D converter 10A into an enhancing luminance signal Y'd (i, j) for enhancing an edge portion of an image based upon the pixel-position-depending region coefficient C [Yd (i, j)] supplied from the uniform region detecting apparatus 1A, and then supplies this enhancing luminance signal Y'd (i, j) to a D/A converter 32 (will be discussed later).

The D/A converter 32 D/A-converts the enhancing luminance signal Y'd (i, j) equal to the digital signal supplied from the edge enhancer 31 into an enhancing luminance signal Y'a (i, j) in an analog signal form, which will be outputted outside this edge enhancing apparatus 30.

Figure 6:
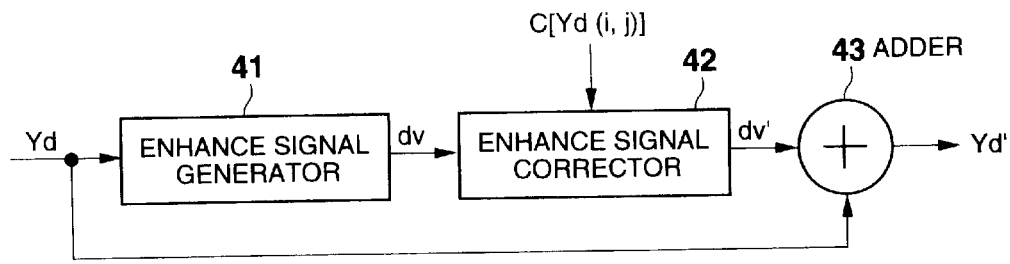
FIG. 6 is a schematic block diagram for indicating an arrangement of an edge enhancer 31 shown in FIG. 5.

Referring now to a block diagram of the edge enhancer 31 of FIG. 6, the description will be made of the arrangement of the edge enhancer 31 indicated in FIG. 5. The digital luminance signal Yd (i, j) outputted from the A/D converter 10A of FIG. 5 is furnished to an enhancing signal generator 41 and an adder 43, provided within the edge enhancer 31. The enhancing signal generator 41 calculates the secondary differentiated value dv (i, j) of the digital luminance signal Yd (i, j) by employing the above-explained formula (1), and supplies the calculated secondary differentiated value dv (i, j) as the enhancing signal to an enhancing signal corrector 42.

The pixel-position-depending region coefficient C [Yd (i, j)] outputted from the uniform region detecting apparatus 1A shown in FIG. 5 is supplied to the enhancing signal corrector 42 employed in the edge enhancer 31. The enhancing signal corrector 42 produces a corrected enhancing signal dv' (i, j) based upon the supplied pixel-position-depending uniform region coefficient C [Yd (i, j)] which will be then supplied to the adder 43 (will be explained later).

The adder 43 adds the corrected enhancing signal dv'(i,j) supplied from the enhancing signal corrector 42 to the digital luminance signal Yd (i, j) supplied from the D/A converter 10A shown in FIG. 5 every pixel position, thereby producing the enhancing luminance signal Y'd (i, j) which will be then supplied to the D/A converter 32 indicated in FIG. 5.

Next, operations of the edge enhancing apparatus 30 according to this embodiment will be explained. The analog luminance signal Ya is A/D-converted into the digital luminance signal Yd by the A/D converter 10A, and then this digital luminance signal Yd is supplied to the uniform region detecting apparatus 1A and the edge enhancer 31 (i.e., enhancing signal generator 41 and adder 43 employed in edge enhancer 31). The uniform region detecting apparatus 1A produces the above-described pixel-position-depending region coefficient C [Yd (i, j)] based upon the supplied digital luminance signal Yd (i, j), and supplies this pixel-position-depending uniform region coefficient C [Yd (i, j)] to the enhancing signal corrector 42 employed in the edge enhancer 31. As previously described, the time required to produce the pixel-position-depending uniform region coefficient C [Yd (i, j)] is equal to the time for one screen.

The enhancing signal generator 41 calculates the secondary differentiated value (enhancing signal) of the supplied digital luminance signal Yd (i, j) based upon the above-described formula (1), and supplies this calculated secondary differentiated value dv to the enhancing signal corrector 42. The enhancing signal corrector 42 converts the enhancing signal dv supplied from the enhancing generator 41 into a corrected enhancing signal dv' by using the following formula (5):

$$dv'(i,j) = \begin{cases} dv(i,j) \ldots |dv(i,j)| \geq TH_3 \\ (1 - C(i,j)) \cdot dv(i,j) \ldots |dv(i,j)| < TH_3 \end{cases} \quad (5)$$

It should be noted that symbol "$TH_3$" shown in the formula (5) denotes a previously set threshold value.

In other words, the enhancing signal corrector 42 compares a preselected threshold value $TH_3$ with the absolute value of the supplied secondary differentiated value dv. Then, when the absolute value of the secondary differentiated value dv is greater than, or equal to a predetermined threshold value $TH_3$, this enhancing signal corrector 42 judges that this position corresponds to an edge portion (edge portion) of an image, and therefore outputs the secondary differentiated value dv (i, j) of this position as the corrected enhancing signal dv' (i, j).

On the other hand, in such a case that the absolute value of the secondary differentiated value dv supplied from the enhancing signal generator 41 is smaller than a predetermined threshold value $TH_3$, the enhancing signal corrector 42 newly produces a corrected enhancing signal dv' (i, j) by employing the uniform region coefficient C (i, j) of the pixel position corresponding to the pixel-position-depending uniform region coefficient C [Yd (i, j)] supplied from the uniform region detecting apparatus 1A, and then outputs this newly produced corrected enhancing signal dv' (i, j) therefrom. In this case, when the value of the uniform region coefficient C (i, j) is small, since there is a small possibility that this position is contained in the uniform region, such a corrected enhancing signal dv' (i, j) having a large value (maximum value thereof is dv (i, j)) is produced. To the contrary, when the value of the uniform region coefficient C (i, j) is large (in particular, this value becomes 1), since there is a great possibility that this position is contained in the uniform region, a corrected enhancing signal dv' (i, j) having a small value (minimum value thereof is 0) is produced, and is supplied to the adder 43.

In other words, the enhancing signal corrector 42 supplies to the adder 43, the secondary differentiated value dv as the corrected enhancing signal dv' without any correction at such a position where the luminance level is greatly changed, whereas the enhancing signal corrector 42 attenuates the enhancing signal (secondary differentiated value) dv in accordance with the value of the uniform region coefficient C (i, j) at such a position where the luminance level is slightly changed, and then supplies this attenuated enhancing signal as the corrected enhancing signal dv' to the adder 43.

The adder 43 adds the corrected enhancing signal dv' supplied from the enhancing signal corrector 42 to the digital luminance signal Yd (i, j) supplied from the A/D converter 10A shown in FIG. 5 to thereby produce an enhanced luminance signal Y'd (i, j) which will be then supplied to the D/A converter 32. The enhanced luminance signal Y'd (i, j) corresponding to the digital signal supplied to the D/A converter 32 is converted into an enhanced luminance signal Y'a (i, j) in an analog signal form, which will then be outputted externally.

In accordance with this embodiment, since the edge may be enhanced based on the correct uniform region coefficient C (i, j) produced by the uniform region detecting apparatus 1A, the places other than the uniform region can be correctly enhanced.

On the other hand, since the uniform region detecting apparatus 1A provided with the edge enhancing apparatus 30 shown in FIG. 5 owns the substantially same arrangement as that of the uniform region detecting apparatus 1 shown in FIG. 1, as previously explained, the uniform region coefficient C [L] is allocated to the respective pixels of the screen with having a delay of one screen within the uniform region detecting apparatus 1A, so that no correct detecting process of the uniform region is carried out (namely, pixel-position-depending uniform region coefficient C [Yd (i, j)] is produced by employing the coefficient table C delayed by one screen). Accordingly, the correctness of the edge enhancing process executed based on this pixel-position-depending uniform region coefficient C' [Yd (i, j)] would be deteriorated. To avoid such deterioration, another edge enhancing apparatus shown in FIG. 7 may be arranged.

Figure 7:
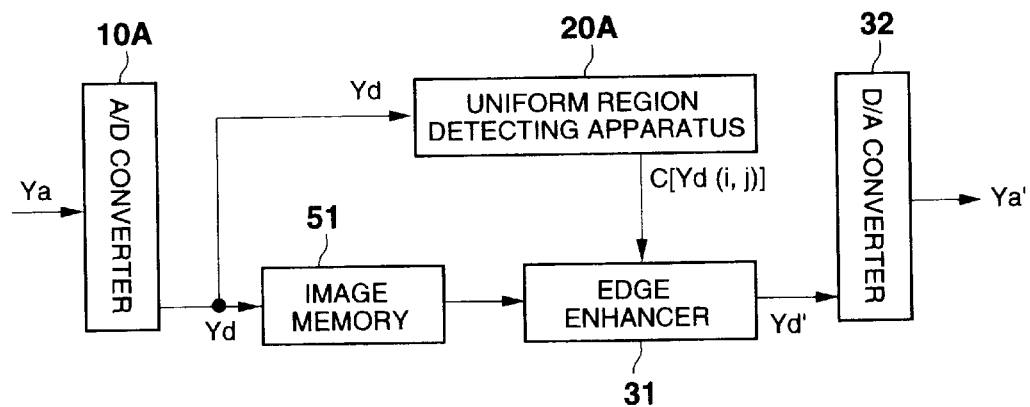
FIG. 7 is a schematic block diagram for representing an arrangement of another edge enhancing apparatus according to another embodiment of the present invention.

That is, FIG. 7 is a schematic block diagram for representing an arrangement of another edge enhancing apparatus according to another embodiment of the present invention. Although the arrangement of the edge enhancing apparatus 50 according to this embodiment is in principle similar to that of the edge enhancing apparatus 30 indicated in FIG. 5, this edge enhancing apparatus 50 has the below-mentioned different arrangement.

That is to say, in the edge enhancing apparatus 50 according to this embodiment, there is provided a uniform region detecting apparatus 20A having the substantially same structure as that of the uniform region detecting apparatus 20 shown in FIG. 4, namely no A/D-converter 10 is employed, which is different from the edge enhancing apparatus 30 of FIG. 5.

Moreover, in the edge enhancing apparatus 50 of this embodiment, such an image memory 51 which delays the entered digital luminance signal Yd by one screen to output the delayed digital luminance signal is interposed between the A/D converter 10A and the edge enhancer 31. It should be understood that other arrangements of this edge enhancing apparatus 50 are similar to those of the edge enhancing apparatus 30 shown in FIG. 5.

In case of this embodiment, the pixel-position-depending uniform region coefficient C [Yd (i, j)] outputted from the uniform region detecting apparatus 20A is produced by making a correspondence between the input image (digital luminance signal Yd (i, j) and the uniform region coefficient C [L] without any time delay of one screen. Furthermore, the digital luminance signal Yd (i, j) supplied to the edge enhancer 31 is delayed by one image by the image memory 51, so that the edge enhancing process operation of the image is also performed without any time delay of one screen. As a consequence, in this embodiment, in particular, when the inputted image signal is the moving picture signal, the image edge enhancing process operation can be correctly carried out.

Since two sets of memories (namely, image memory 21 shown in FIG. 4—and image memory 51 employed in uniform region detecting apparatus 20A) are employed so as to delay the digital luminance signal Yd (i, j) by one screen in the edge enhancing apparatus 50 indicated in FIG. 7, the manufacturing cost thereof is increased. To reduce this cost, another edge enhancing apparatus as shown in FIG. 8 may be arranged.

Figure 8:
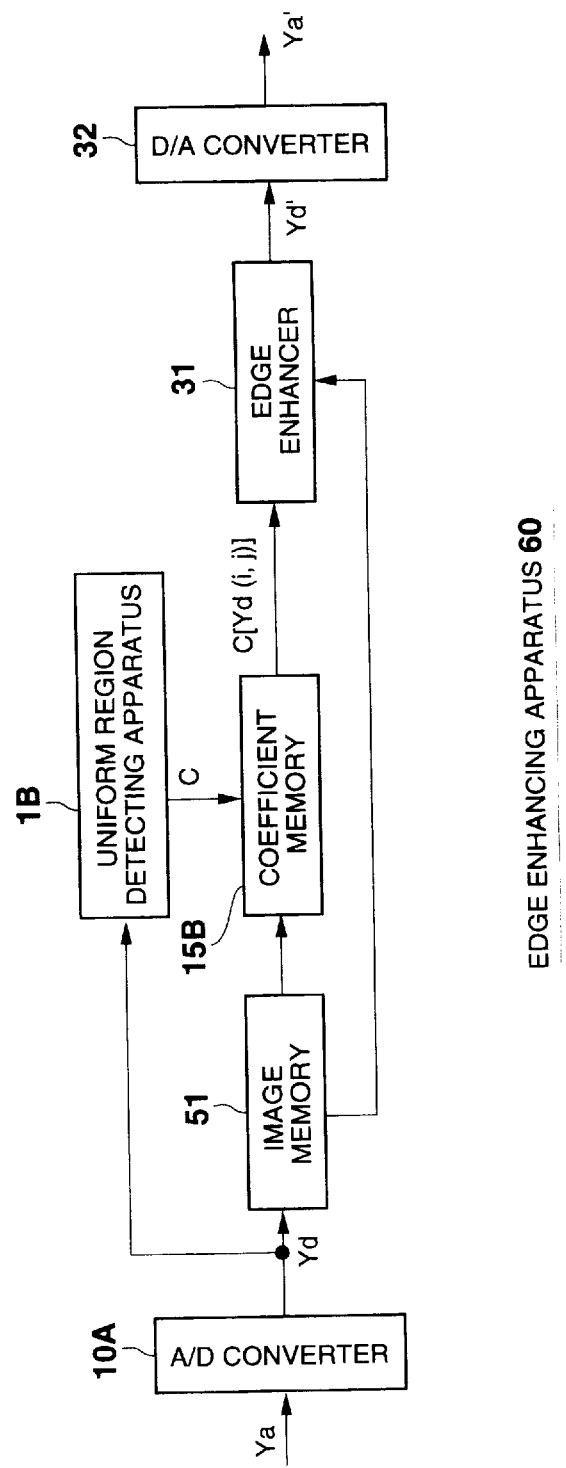
FIG. 8 is a schematic block diagram for representing an arrangement of another edge enhancing apparatus according to another embodiment of the present invention.

That is, FIG. 8 is a schematic block diagram for indicating an arrangement of an edge enhancing apparatus 60 according to another embodiment of the present invention. The basic arrangement of the edge enhancing apparatus 60 is similar to that of the above-described edge enhancing apparatus 50 represented in FIG. 7, but this edge enhancing apparatus 60 owns the below-mentioned different arrangement.

Different from the edge enhancing apparatus 50 of FIG. 7, in the edge enhancing apparatus 60 according to this embodiment, a uniform region detecting apparatus 1B having the substantially same arrangement (namely, neither A/D converter 10, nor coefficient 15 is employed) as that of the uniform region detecting apparatus 1 shown in FIG. 1 is provided as an apparatus for producing a uniform region coefficient C [L] (coefficient table C) of one screen. Accordingly, the uniform region detecting apparatus 1B outputs the coefficient table C without establishing the corresponding relationship between the uniform region coefficient C [L] and the respective pixels (namely, without producing pixel-position-depending uniform region coefficient C [Yd (i, j)].

Furthermore, a coefficient memory 15B for receiving the coefficient table C and for establishing the corresponding relationship between the uniform region coefficient C [L] and the respective pixels of the image is provided at the post stage of the image memory 51. The image memory 51 supplies the digital luminance signal Yd (i, j) delayed by one screen to the coefficient memory 15B and the edge enhancer 31.

As a consequence, since the digital luminance signal Yd (i, j) supplied to the coefficient memory 15B is delayed by one screen in the edge enhancing apparatus 60 according to this embodiment, the corresponding relationship between the uniform region coefficient C [L] and the respective pixels of the image can be established without any time delay. In addition, since the digital luminance signal Yd (i, j) supplied to the edge enhancer 31 is also delayed by one screen, the edge enhancing signal Yd' (i, j) may be produced without any time delay, so that the edge enhancing process can be correctly performed.

With employment of the above-described arrangement, only one image memory (namely, only image memory 51) used to delay the digital luminance signal Yd (i, j) by one screen is employed, resulting in lowering of the manufacturing cost.

Figure 9:
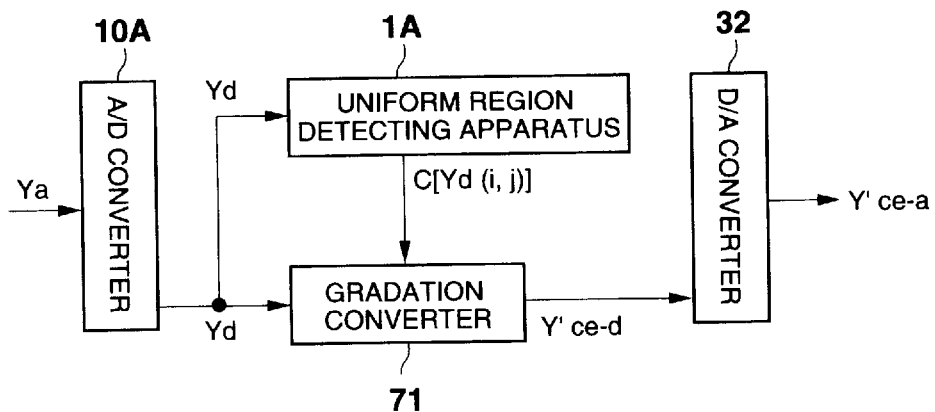
FIG. 9 is a schematic block diagram for showing an arrangement of a gradation converting apparatus according to an embodiment of the present invention.

FIG. 9 is a schematic block diagram for indicating an arrangement of a gradation converting apparatus 70 according to an embodiment of the present invention. A basic arrangement of the gradation converting apparatus 70 according to this embodiment is similar to that of the edge enhancing apparatus 30 shown in FIG. 5. Instead of the edge enhancer 31 of this edge enhancing apparatus 30, a gradation converter 71 for enhancing contrast of an image is employed in the gradation converting apparatus 70.

Figure 10:
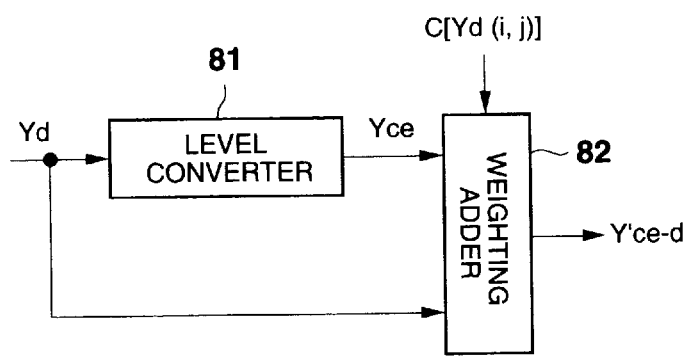
FIG. 10 is a schematic block diagram for indicating an arrangement of a gradation converter 17 shown in FIG. 9.

FIG. 10 is a schematic block diagram for indicating a structural example of the gradation converter 71 shown in FIG. 9. In this gradation converter 71, a level converter 81 receives a digital luminance signal Yd (i, j) supplied from an A/D converter 10A, converts the gradation of this digital luminance signal Yd (i, j) based upon a predetermined gradation converting function "g" (will be explained later) to thereby produce a gradation-converted luminance signal Yce (i, j), and then supplies this gradation-converted luminance signal Yce (i, j) to a weighing adder 82.

The weighing adder 82 receives the digital luminance signal Yd (i, j) supplied from the A/D converter 10A, the gradation-converted luminance signal Yce (i, j) supplied from the level converter 81, and the pixel-position-depending uniform region coefficient C [Yd (i, j)] supplied from the uniform region detecting apparatus 1A. Then, this weighing adder 82 multiplies the digital luminance signal Yd (i, j) and the gradation-converted luminance signal Yce (i, j) by such a weight based on a uniform region coefficient C (i, j) of this pixel position, and then adds the weighted digital luminance signal to the weighted gradation-converted luminance signal to thereby produce a corrected gradation-converted luminance signal Y'ce-d (i, j) which will then be supplied to a D/A converter 32 (will be discussed later).

Subsequently, operations of the gradation converting apparatus 70 according to this embodiment will now be described.

In this gradation converting apparatus 70, the A/D converter 10A A/D-converts the analog luminance signal Ya into the digital luminance signal Yd which is supplied to the uniform region detecting apparatus 1A and the gradation converter 71 (level converter 81 and weighing adder 82 employed in gradation converter 71). Based on the supplied digital luminance signal Yd (i, j), the uniform region detecting apparatus 1A produces the pixel-position-depending uniform region coefficient C [Yd (i, j)], and supplies this pixel-position-depending uniform region coefficient C [Yd (i, j)] to the weighing adder 82 employed in the gradation converter 71.

The level converter 81 performs the gradation conversion of the entered digital luminance signal Yd (i, j) based upon the following formula (6):

$$Yce(i, j) = g [Yd(i, j)] \qquad (6).$$

Figure 11:
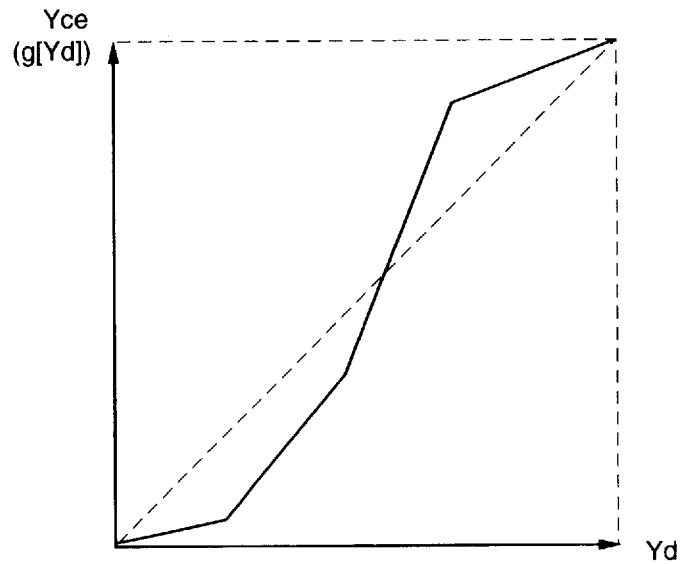
FIG. 11 graphically indicates an example of a gradation converting function "g"

The gradation converting function "g" in the above-described formula (6) denotes a function used to enhance contrast of an image, and is such a function conventionally proposed. In this embodiment, for example, a nonlinear monotone increasing function as represented in FIG. 11 is employed as this gradation converting function "g". In other words, in case of such a digital luminance signal Yd (i, j) having a small value, this digital luminance signal is gradation-converted in such a manner that this value is reduced. Conversely, in case of such a digital luminance signal Yd (i, j) having a large value, this digital luminance signal is gradation-converted in such a way that this value is increased.

Then, the level converter 81 furnishes the produced gradation-converted luminance signal Yce (i, j) to the weighing adder 82. The weighing adder 82 receives the pixel-position-depending uniform region coefficient C [Yd (i, j)] supplied from the uniform region detecting apparatus 1A, the gradation-converted luminance signal Yce (i, j) supplied from the level converter 81, and the digital luminance signal Yd (i, j) supplied from the A/D converter 10A. Thus, this weighing adder 82 produces the corrected gradation-converted luminance signal Y'ce-d (i, j) based upon the following formula (7):

$$Y'ce\text{-}d(i, j) = C(i, j) \cdot Yd(i, j) + (1 - C(i, j)) \, Yce(i, j) \qquad (7).$$

In other words, at a pixel position whose uniform region coefficient C (i, j) is large (namely, a pixel position with a high probability that this pixel position is involved in the uniform region), the weighing adder 82 increases the weight of the digital luminance signal Yd (i, j) which is not gradation-converted, and decreases the weight of the gradation-converted luminance signal Yce (i, j). Then, this weighing adder 82 adds the weighted digital luminance signal Yd (i, j) to the weighted gradation-converted luminance signal Yce (i, j) to thereby produce the corrected gradation-converted luminance signal Y'ce-d (i, j). Namely, this corrected gradation-converted luminance signal Y'ce-d (i, j) which is produced owns such a value approximated to the value of the digital luminance signal Yd (i, j) which is not yet gradation-converted.

On the other hand, at a pixel position whose uniform region coefficient C (i, j) is small (namely, a pixel position with a low probability that this pixel position is involved in the uniform region), the weighing adder 82 decreases the weight of the digital luminance signal Yd (i, j) which is not gradation-converted, and increases the weight of the gradation-converted luminance signal Yce (i, j). Then, this weighing adder 82 adds the weighted digital luminance signal Yd (i, j) to the weighted gradation-converted luminance signal Yce (i, j) to thereby produce the corrected gradation-converted luminance signal Y'ce-d (i, j). Namely, this corrected gradation-converted luminance signal Y'ce-d (i, j) which is produced owns such a value approximated to the value of the gradation-converted luminance signal Yce (i, j).

The corrected gradation-converted luminance signal Y'ce-d (i, j) produced by the weighing adder 82 is supplied to the D/A converter 32 so as to be converted into an analog corrected gradation-converted luminance signal Y'ce-a which will then be outputted.

It should also be noted that when the gradation converter 71 of the gradation converting apparatus 70 according to this embodiment is arranged at the position of the edge enhancer 31 shown in FIG. 7 or FIG. 8, the above-described time delay problem by one screen may be solved and therefore the gradation conversion may be correctly performed.

FIG. 12 is a schematic block diagram for indicating an arrangement of a noise removing (eliminating) apparatus 90 according to an embodiment of the present invention. A basic arrangement of the noise removing apparatus 90 according to this embodiment is similar to that of the above-described edge enhancing apparatus 30 indicated in FIG. 5. In this noise removing apparatus 90, an adaptive type smoothing device 91 is employed instead of the edge enhancer 31.

Figure 13:
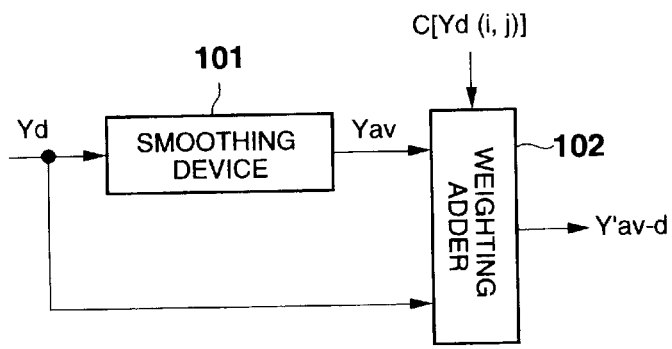
FIG. 13 is a schematic block diagram for representing an arrangement of an adaptive type smoothing device 91 shown in FIG. 12.

FIG. 13 is a block diagram for indicating a structural example of the adaptive type smoothing device 91 shown in FIG. 12. In this adaptive type smoothing device 91, a smoothing device 101 smoothes a digital luminance signal Yd (i, j) supplied from the A/D converter 10A by way of either a spatial mean value (averaging) filter or a recursive temporal low-pass filter used to filter a moving picture (will be explained later), thereby producing a smoothed luminance signal Yav (i, j).

A weighing adder 102 receives the digital luminance signal Yd (i, j), the smoothed luminance signal Yav (i, j), and the pixel-position-depending uniform region coefficient C [Yd (i, j)], and multiplies the digital luminance signal Yd (i, j) and the smoothed luminance signal Yce (i, j) by a weight defined by the uniform region coefficient C (i, j) of this pixel position. Then, this weighing adder 102 adds the weighted digital luminance signal Yd (i, j) to the weighted smoothed luminance signal Yce (i, j) to thereby produce a noise-removed luminance signal Y'av-d (i, j) (will be discussed later). Thus, this produced noise-removed luminance signal Y'av-d (i, j) is supplied to a D/A converter 32.

Next, operations of the noise removing apparatus 90 according to this embodiment will now be described.

The analog luminance signal Ya is A/D-converted by the A/D converter 10A into the digital luminance signal Yd, and then this digital luminance signal Yd is furnished to the uniform region detecting apparatus 1A and the adaptive type smoothing device 91 (smoothing device 101 and weighing adder 102 employed in adaptive type smoothing device 91).

The smoothing device 101 employed in the adaptive type smoothing device 91 smoothes the digital luminance signal Yd (i, j) supplied from the A/D converter 10A by utilizing such a spatial mean value filter as expressed in the below-mentioned formula (8) to thereby produce the smoothed luminance signal Yav (i, j).

$$Y_{av}(i,j) = \sum_{di=-M/2}^{M/2} \sum_{dj=-N/2}^{N/2} Y_d(i - di, j - dj). \qquad (8)$$

It should be noted in this formula (8) that preselected values "M" and "N" indicate ranges of approximate regions used to calculate the mean values. When the image signal entered into the noise removing apparatus 90 according to this embodiment is a moving picture signal, the smoothing device 101 produces the smoothed luminance signal with employment of a recursive low-pass filter as expressed in the following formula (9):

$$Yav(i, j, k) = b \cdot Yd(i, j, k) + (1-c) \cdot Yav(i, j, k-1) \qquad (9)$$

Note that $0 \leq b < 1$.

It should also be noted in the above-described formula (9) that symbol Yd (i, j, k) expresses a digital luminance signal inputted at a time instant "k", and symbol Yav (i, j, k) denotes a smoothed luminance signal of the digital luminance signal Yd (i, j, k), and further, symbol "b" represents a weighing coefficient with respect to an image at a present time instant.

The smoothed luminance signal Yav (i, j) calculated by the smoothing device 101 is supplied to the weighing adder 102. This weighing adder 102 calculates the noise-removed luminance signal Y'av-d (i, j) based upon the following formula (10):

$$Y'av\text{-}d(i, j) = C(i, j) \cdot Yav(i, j) + (1 - C(i, j)) \cdot d(i, j) \qquad (10)$$

As apparent from the above-described formula (10), the weighing adder 102 increases the weight of the smoothed luminance signal Yav (i, j) at such a pixel position having a high possibility that this pixel position is contained in the uniform region (namely, uniform region coefficient C (i, j) is large), and also decreases the weight of the digital luminance signal Yd (i, j) which is not smoothing-processed (namely, smoothing effect is enhanced at such pixel position having high possibility that this pixel position is involved in uniform region).

On the other hand, the weighing adder 102 decreases the weight of the smoothed luminance signal Yav (i, j) at such a pixel position having a low possibility that this pixel position is contained in the uniform region (namely, uniform region coefficient C (i, j) is small), and also increases the weight of the digital luminance signal Yd (i, j) which is not smoothing-processed (namely, smoothing effect is weakened at such pixel position having low possibility that this pixel position is involved in uniform region).

The digital noise-removed luminance signal Y'av-d (i, j) calculated by the weighing adder 102 is supplied to the D/A converter 32 so as to be converted into an analog noise-removed luminance signal Y'av-d (i, j) which will then be outputted.

It should be understood that when the adaptive type smoothing device 91 of the noise removing apparatus 90 according to this embodiment is arranged at the position of the edge enhancer 31 shown in FIG. 7, or FIG. 8, the above-explained time delay problem by 1 screen may be solved and therefore, the correct noise removing process operation can be done.

A further description will now be made of the above-explained threshold value $TH_1$ set in the histogram generators 12 indicated in FIG. 1 and FIG. 4. In accordance with the histogram generators 12 indicated in FIG. 1 and FIG. 4, the histogram H is generated while recognizing that a low level variation in the luminance signal is caused by the noise. However, as to such a luminance signal whose input level is low (namely, a luminance signal derived from a dark portion), since a variation in this luminance signal itself which is not the noise is also low, if the threshold value $TH_1$ is fixed to a predetermined value, then the dark portion would be excessively recognized as the uniform region.

As a consequence, in such a portion where a luminance level "L" is low (namely, dark portion), this threshold value $TH_1$ is set to be small, taking into account a reduction of a change amount of a luminance signal which is not equal to noise. In other words, when the luminance level L is low, this threshold value $TH_1$ is lowered. Namely, the threshold value $TH_1$ is set in accordance with the adaptive operation of the luminance level.

However, when the threshold value $TH_1$ is set to all of the luminance levels L as described above, there is some possibility that the uniform region could be hardly detected. Accordingly, there is another problem that the noise elimination could not be correctly performed.

On the other hand, also in such noise containing equal level changes, when noise of a low level region (dark portion) contained in an image whose dynamic range is wide is compared with noise of a low level region contained in an image whose dynamic range is narrow (for instance, night view), the noise contained in the image with the narrow dynamic range becomes apparent. As a result, in particular, it is required to correctly remove this noise in the image portion with such a narrow dynamic range.

Figure 14:
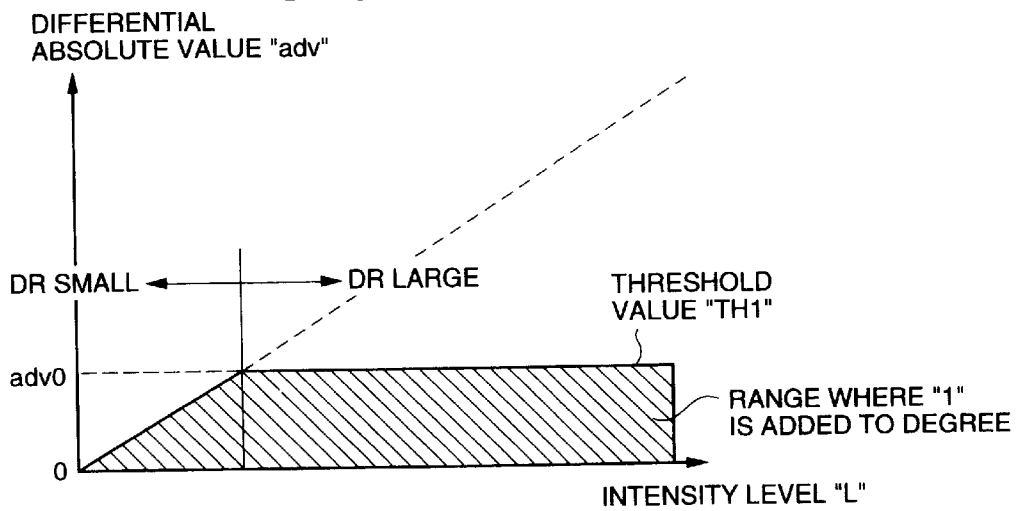
FIG. 14 is an explanatory diagram for explaining how to set a predetermined threshold value $TH_1$ to a histogram generator 12.

Under such a circumstance, the threshold value $TH_1$ to be set in the histogram generator 12 is set as shown in a boundary line of FIG. 14. That is, in accordance with the above-explained luminance level adaptation, the lower the luminance level L becomes, the smaller the threshold value $TH_1$. Conversely, when the luminance level L is high, the threshold value $TH_1$ is fixed to advD (namely, even when luminance level L is increased, threshold value $TH_1$ is not increased). Also, in accordance with the above-explained dynamic range adaptation, when the dynamic range is narrow, a level of an inflection point of the threshold value (namely, inflection point of boundary line shown in FIG. 14) is set to a low level, whereas when the dynamic range is wide, the level of the infliction point of the threshold value is set to a high level.

In other words, in the narrow dynamic range portion, the threshold value $TH_1$ is set to the histogram generator 12 in order to mainly remove the noise, whereas in the wide dynamic range portion, the threshold value $TH_1$ is set to the histogram generator 12 so as to mainly enhance the edge and convert the gradation.

It should be understood that this setting operation of the threshold value $TH_1$ is not limited to the above-described uniform region detection, edge enhancement, gradation conversion, and noise elimination, but may be set other image processing operation in order to adapt this image processing operation.

As previously described in detail, according to the image processing apparatus, the image processing method, the noise removing apparatus, and also the noise removing method of the present invention, the high frequency components of the luminance signal of the overall image within one screen are extracted, and then the uniform region is detected based upon the extracted high frequency components. As a consequence, the uniform region can be correctly detected and also the noise can be precisely removed.

What is claimed is:

1. An image processing apparatus for extracting a uniform region whose luminance level change is small from an image containing noise, comprising:

extracting means for extracting a high frequency component of a luminance signal of said image over an entire portion of said image within one screen;

histogram generating means for generating a histogram of a luminance level of said luminance signal for one screen on the basis of the output value of said extracting means;

coefficient calculating means for analyzing said histogram to calculate a predetermined coefficient indicative of likeness of the uniform region every said luminance level; and pixel-position-depending coefficient producing means for establishing a correspondence relationship between said predetermined coefficient calculated by said coefficient calculating means and all of the pixel positions on the image in correspondence to the luminance level of said luminance signal from each of said pixel positions.

2. An image processing apparatus as claimed in claim 1 wherein:
said histogram generating means detects only such an output value lower than a predetermined level from the output values of said extracting means.

3. An image processing apparatus as claimed in claim 1, further comprising:
delay means for delaying said luminance signal in order that said coefficient correspondence relationship establishing operation by said pixel-position-depending coefficient producing means is correctly performed without any time delay for one screen.

4. An image processing apparatus as claimed in claim 1 wherein:
said coefficient calculating means sets said predetermined coefficient corresponding to said luminance level where the frequency of said histogram is large, to such a value having a high degree of probability that said value corresponds to said uniform region.

5. An image processing apparatus as claimed in claim 1, further comprising:
signal processing means for performing a predetermined process operation to said luminance signal on the basis of said predetermined coefficient.

6. An image processing apparatus as claimed in claim 5 wherein:
said signal processing means performs an edge enhancing process operation for enhancing an edge portion of said image to said luminance signal.

7. An image processing apparatus as claimed in claim 5 wherein:
said signal processing means performs a gradation converting process operation for converting a gradation characteristic of said image so as to enhance contrast thereof to said luminance signal.

8. An image processing apparatus as claimed in claim 5, further comprising:
delay means for delaying said luminance signal in order that the signal process operation by said signal processing means is correctly carried out without any time delay for one screen.

9. An image processing method for extracting a uniform region whose luminance level change is small from an image containing noise, comprising the steps of:
extracting a high frequency component of a luminance signal of said image over an entire portion of said image within one screen;
generating a histogram of a luminance level of said luminance signal for one screen on the basis of the extracted output value;
analyzing said histogram to calculate a predetermined coefficient indicative of likeness of the uniform region every said luminance level; and
establishing a correspondence relationship between said predetermined coefficient and all of the pixel positions on the image in correspondence to the luminance level of said luminance signal from each of said pixel positions.

10. An image processing method as claimed in claim 9 wherein:
said histogram is generated based only on an extracted value lower than a preselected level among the extracted values of the high frequency component of the luminance signal of said image.

11. A noise removing apparatus for removing noise of an image, comprising:
extracting means for extracting a high frequency component of a luminance signal of said image over an entire portion of said image within one screen;
histogram generating means for generating a histogram of a luminance level of said luminance signal for one screen on the basis of the output value of said extracting means;
coefficient calculating means for analyzing said histogram to calculate a predetermined coefficient indicative of likeness of the uniform region every said luminance level;
pixel-position-depending coefficient producing means for establishing a correspondence relationship between said predetermined coefficient calculated by said coefficient calculating means and all of the pixel positions on the image in correspondence to the luminance level of said luminance signal from each of said pixel position; and
smoothing means for smoothing said luminance signals of all of said pixel positions on said image on the basis of said preselected coefficients made in correspondence with all of said pixel positions on said image.

12. A noise removing apparatus as claimed in claim 11 wherein:
said histogram generating means detects only such an output value lower than a preselected level from the output values of said extracting means.

13. A noise removing apparatus as claimed in claim 11 wherein:
said coefficient calculating means sets said predetermined coefficient corresponding to said luminance level where the frequency of said histogram is large to such a value having a high probability that said value corresponds to said uniform region.

14. A noise removing apparatus as claimed in claim 11, further comprising:
delay means for delaying said luminance signal in order that said preselected coefficient correspondence establishing process operation by the pixel-position-depending coefficient producing means is correctly carried out with said smoothing process operation of said luminance signal by said smoothing means without any time delay for one image.

15. A noise removing apparatus as claimed in claim 11 wherein:
said smoothing means performs a spatial smoothing process operation to said luminance signal.

16. A noise removing apparatus as claimed in claim 11 wherein:
said smoothing means performs a temporal smoothing process operation to said luminance signal.

17. A noise removing method for removing noise of an image, comprising the steps of:
extracting a high frequency component of a luminance signal of said image over an entire portion of said image within one screen;
generating a histogram of a luminance level of said luminance signal for one screen on the basis of the extracted value;

analyzing said histogram to calculate a predetermined coefficient indicative of likeness of the uniform region every said luminance level;

establishing a correspondence relationship between said predetermined coefficient and all of the pixel positions on the image in response to the luminance level of said luminance signal from each of said pixel positions; and smoothing said luminance signals of all of the pixel positions within one screen on the basis of said preselected coefficients made in correspondence to all of said pixel positions on the screen.

18. A noise removing method as claimed in claim 17 wherein:

said histogram generating means detects only such an output value lower than a predetermined level from the output values of said extracting means.

* * * * *